US012638887B2

(12) United States Patent
Song et al.

(10) Patent No.: US 12,638,887 B2
(45) Date of Patent: May 26, 2026

(54) ELECTRONIC DEVICE INCLUDING WINDOW GLASS AND METHOD FOR MANUFACTURING THE SAME

(71) Applicant: SAMSUNG ELECTRONICS CO., LTD., Suwon-si (KR)

(72) Inventors: Bomina Song, Suwon-si (KR); Dongwoo Lee, Suwon-si (KR); Dongsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 627 days.

(21) Appl. No.: 18/060,784

(22) Filed: Dec. 1, 2022

(65) Prior Publication Data

US 2023/0168719 A1 Jun. 1, 2023

Related U.S. Application Data

(63) Continuation of application No. PCT/KR2022/019401, filed on Dec. 1, 2022.

(30) Foreign Application Priority Data

Dec. 1, 2021 (KR) ........................ 10-2021-0170319
Nov. 10, 2022 (KR) ........................ 10-2022-0149955

(51) Int. Cl.
*G06F 1/16* (2006.01)
*C03C 15/00* (2006.01)
(Continued)

(52) U.S. Cl.
CPC ............ *G06F 1/1656* (2013.01); *C03C 15/00* (2013.01); *G06F 1/16* (2013.01); *G06F 1/1616* (2013.01);
(Continued)

(58) Field of Classification Search
None
See application file for complete search history.

(56) References Cited

U.S. PATENT DOCUMENTS 11,594,702 B2 2/2023 Kim et al.
2020/0004295 A1 1/2020 Paek et al.
(Continued)

FOREIGN PATENT DOCUMENTS

KR 10-2017-0009833 1/2017
KR 10-2017-0122554 11/2017
(Continued)

OTHER PUBLICATIONS

Extended European Search Report dated Nov. 26, 2024 issued in European Patent Application No. 22901841.1.
(Continued)

*Primary Examiner* — Eli D. Strah
(74) *Attorney, Agent, or Firm* — Nixon & Vanderhye P.C.

(57) ABSTRACT

An embodiment of the disclosure relates to an electronic device including a window glass and a method for manufacturing the same. According to an embodiment, there may be provided an electronic device comprising: a display; a window glass stacked with the display and including a first portion having a specified thickness and a second portion having a thickness less than a thickness of the first portion; and an adhesive member comprising an adhesive material disposed between the display and the window glass; wherein the window glass includes a slope having an angle of 3 degrees or less between the first portion and the second portion.

8 Claims, 15 Drawing Sheets

(51) Int. Cl.
*H04M 1/02* (2006.01)
*H04M 1/18* (2006.01)

(52) U.S. Cl.
CPC ........ *G06F 1/1652* (2013.01); *H04M 1/0214* (2013.01); *H04M 1/0268* (2013.01); *H04M 1/185* (2013.01)

(56) References Cited

U.S. PATENT DOCUMENTS

| | | | | |
|---|---|---|---|---|
| 2020/0277222 | A1* | 9/2020 | Inoue | C03C 15/00 |
| 2020/0292731 | A1 | 9/2020 | Park et al. | |
| 2020/0324521 | A1 | 10/2020 | Park et al. | |
| 2020/0329575 | A1 | 10/2020 | Park et al. | |
| 2020/0392038 | A1 | 12/2020 | Park et al. | |
| 2021/0107826 | A1 | 4/2021 | Hwang et al. | |

FOREIGN PATENT DOCUMENTS

| | | |
|---|---|---|
| KR | 10-2068685 | 1/2020 |
| KR | 10-2069040 | 1/2020 |
| KR | 10-2150392 | 9/2020 |
| KR | 10-2021-0056102 | 5/2021 |
| KR | 10-2021-0077511 | 6/2021 |
| KR | 10-2272926 | 6/2021 |
| WO | 2021/041857 | 3/2021 |

OTHER PUBLICATIONS

Search Report and Written Opinion dated Mar. 2, 2023 issued in International Patent Application No. PCT/KR2022/019401.

* cited by examiner

ELECTRONIC DEVICE INCLUDING WINDOW GLASS AND METHOD FOR MANUFACTURING THE SAME

CROSS-REFERENCE TO RELATED APPLICATIONS

This application is a continuation of International Application No. PCT/KR2022/019401 designating the United States, filed on Dec. 1, 2022, in the Korean Intellectual Property Receiving Office and claiming priority to Korean Patent Application No. 10-2021-0170319, filed on Dec. 1, 2021, in the Korean Intellectual Property Office, and to Korean Patent Application No. 10-2022-0149955, filed on Nov. 10, 2022, in the Korean Intellectual Property Office, the disclosures of all of which are incorporated by reference herein in their entireties.

BACKGROUND

Field

The disclosure relates to an electronic device including a window glass and a method for manufacturing the same.

Description of Related Art

As the demand for mobile communication increases, and the degree of integration of electronic devices increases, various technologies have been developed to enhance the portability of the electronic device and user convenience in use of multimedia functions. For example, there is ongoing vigorous research on foldable electronic devices capable of folding and unfolding the screen.

An electronic device may include a display and may have a window glass to protect the display from external physical/chemical shocks. The window glass may be stacked on one surface of the display and exposed to the outside of the housing. The display includes lines including pixels and thin film transistors and may display images or videos to the outside of the electronic device through the window glass. An adhesive member may be provided between the display and the window glass to adhere them. In the foldable electronic device, the window glass may be implemented as a flexible glass that may be folded or unfolded while being adhered to the display.

The flexible glass applied to the foldable electronic device should have enough durability to leave no crease despite repeated folding, avoid image quality degradation, and prevent physical/chemical impacts to the display. However, thickening the flexible glass to increase rigidity may result in difficulty in folding and use in the foldable electronic device. Thus, in wide use recently are flexible glasses that have increased flexibility by locally thinning the folding portion.

In order to thin the folding portion of the flexible glass, mechanical processing may be applied to cut the folding portion using a CNC tool and/or brush. Or, chemical processing may be applied to etch the folding portion after laminating a film with high acid resistance or depositing an ink with high acid resistance and masking. The mechanical processing may cause the glass surface to be torn or cracked due to physical impact. Further, if a foreign body is left on the glass surface during application of the mechanical processing, severe cracks may occur on the glass due to the foreign body. The chemical processing may reduce cracks that would occur if mechanical process applies. However, as the ink and the glass are together etched by the etching solution, a steep slope surface is created (e.g., 10 degrees or more) at the boundary between the folding portion and its surroundings (e.g., flat portion), causing the boundary of the flexible glass to be easily viewed with the naked eye. For example, in a case where the flexible glass includes a flat portion with a constant thickness and a folding portion with a reduced thickness, more adhesive member is applied to the folding portion which is relatively thin in the flexible glass, causing the boundary between the flat portion and the folding portion to be visible to the naked eye. This may deteriorate the appearance (e.g., aesthetic feel) of the foldable electronic device.

SUMMARY

Embodiments of the disclosure provide a window glass that may reduce cracks and prevent and/or reduce the folding portion boundary from being visible to the naked eye and an electronic device including the same.

According to an example embodiment of the disclosure, there may be provided a foldable electronic device comprising: a display; a flexible glass including a flat portion having a specified thickness and a folding portion having a thickness less than a thickness of the flat portion; and an adhesive member comprising an adhesive material disposed between the display and the flexible glass; wherein the flexible glass includes a slope between the folding portion and the flat portion, and wherein the slope has an angle of 3 degrees or less.

According to an example embodiment of the disclosure, there may be provided a method for manufacturing a portable electronic device comprising: providing a flexible display; positioning a transparent adhesive layer on the flexible display; and positioning a flexible glass on the transparent adhesive layer; wherein a groove with a slope surface of 3 degrees or less is formed by attaching or coating layers with different acid resistance properties around a bent or bendable portion of the flexible glass.

According to various example embodiments of the disclosure, there may be provided a flexible glass with a relatively small slope angle at the boundary of the folding portion in the flexible glass implemented with a thin folding portion by a chemical etching method.

The flexible glass according to various example embodiments of the disclosure may be applied to various form factors (e.g., in-folding foldable electronic devices, out-folding foldable electronic devices, or rollable electronic devices) as well as foldable electronic devices.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, an embodiment of the disclosure is described with reference to the accompanying drawings.

Figure 1:
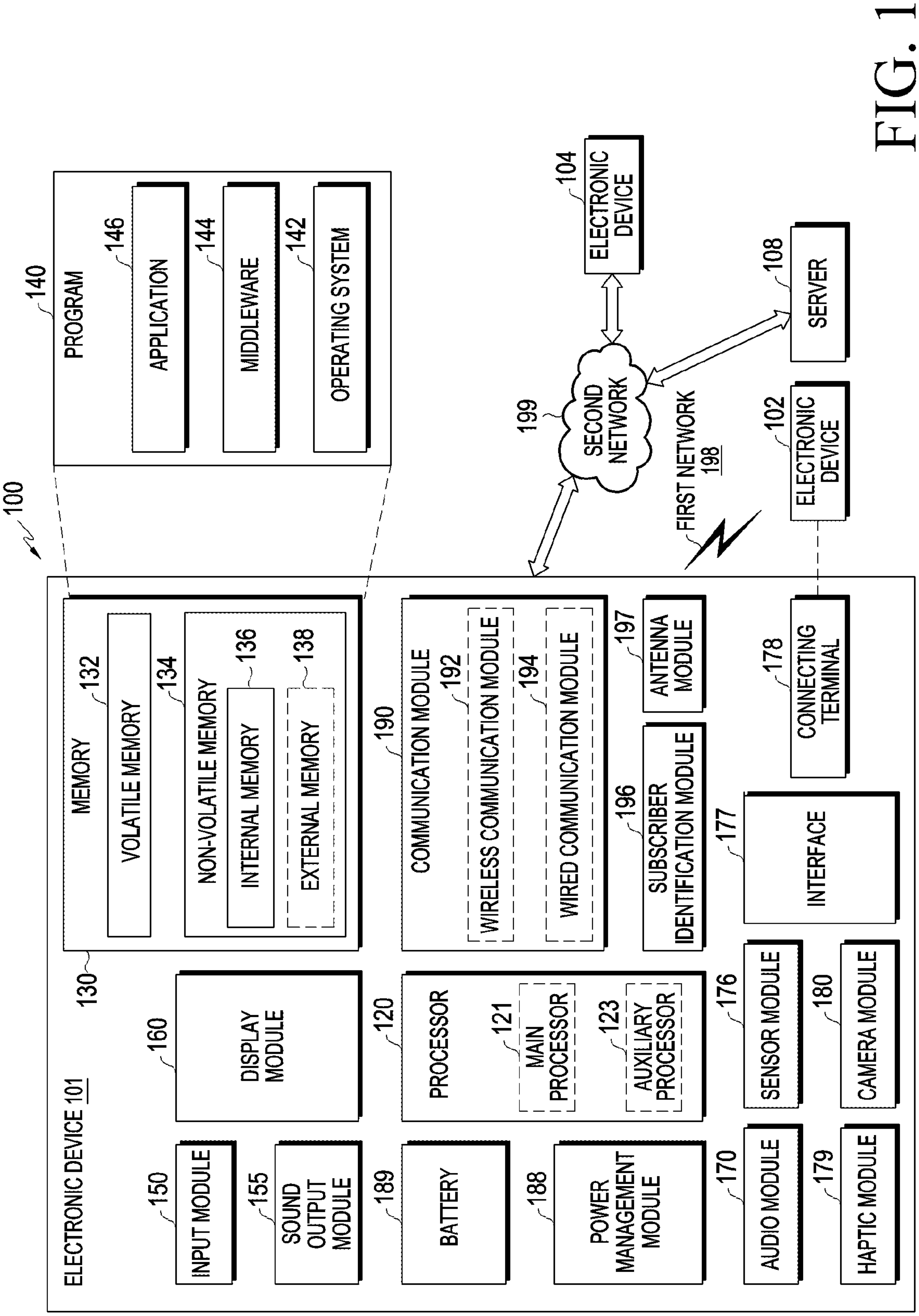
FIG. 1 is a block diagram illustrating an electronic device in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
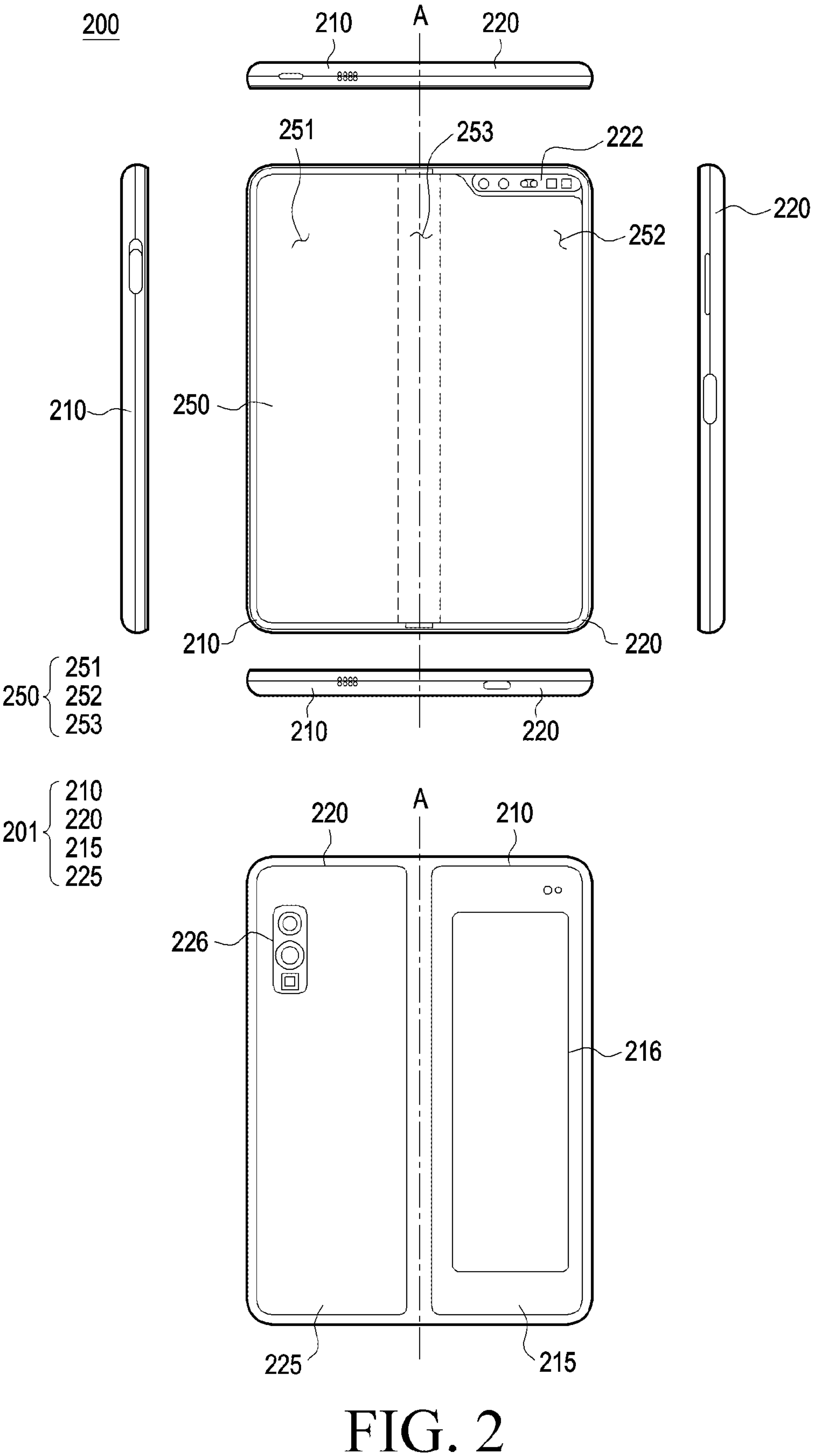
FIG. 2 is a view illustrating an unfolded state of an electronic device according to an embodiment of the disclosure.
Figure 3:
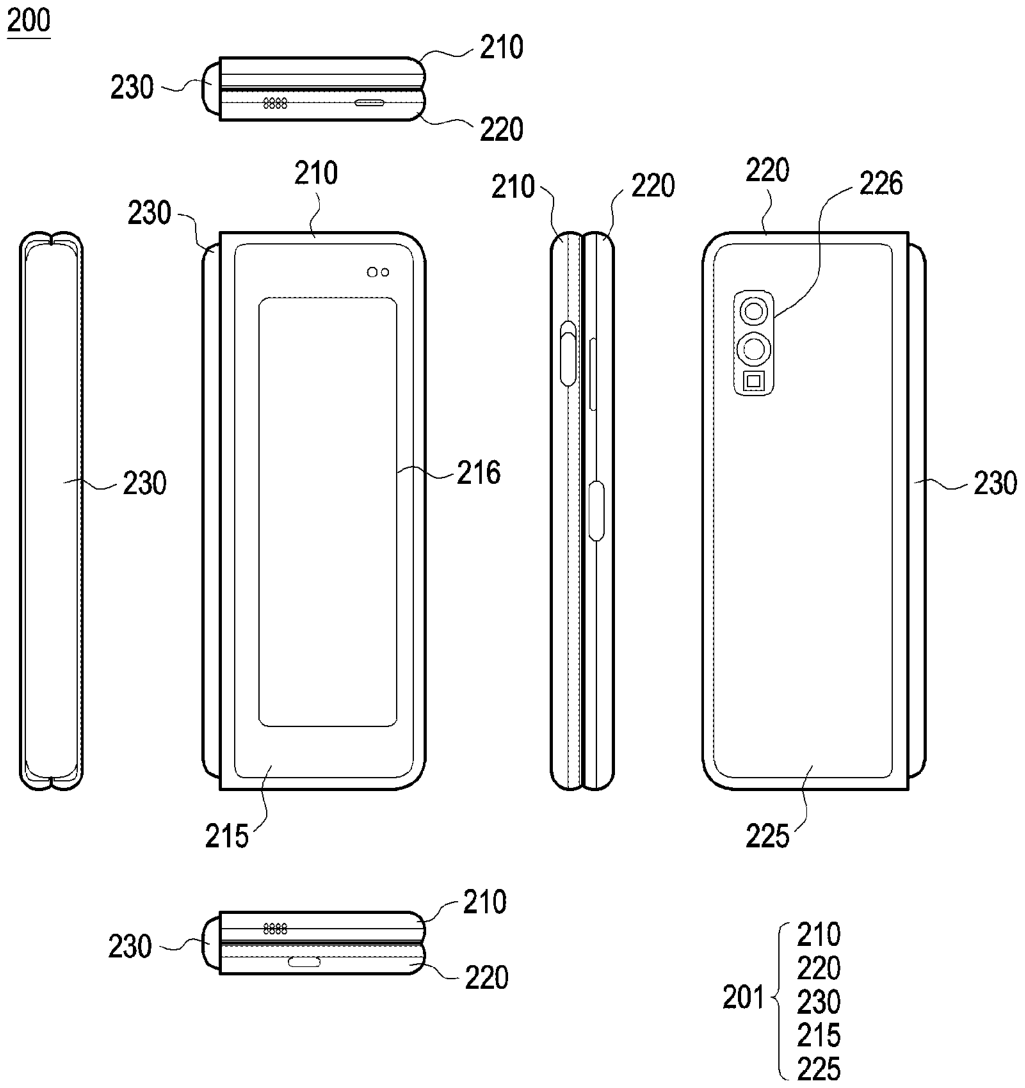
FIG. 3 is a view illustrating a folded state of an electronic device according to an embodiment of the disclosure.

FIG. 2 is a view illustrating an unfolded state of an electronic device 200 according to an embodiment of the disclosure. FIG. 3 is a view illustrating a folded state of an electronic device 200 according to an embodiment of the disclosure. The electronic device 200, as an example of the electronic device 101 shown in FIG. 1, may be a foldable or bendable electronic device.

Referring to FIGS. 2 and 3, according to an embodiment, the electronic device 200 may include a foldable housing 201 and a flexible or foldable display 250 (hereinafter, simply "flexible display 250") (e.g., the display device 160 of FIG. 1) disposed in a space formed by the foldable housing 201. According to an embodiment, the surface where the flexible display 250 is disposed (or the surface where the display 250 is viewed from the outside of the electronic device 200) may be defined as the front surface of the electronic device 200. The opposite surface of the front surface may be defined as a rear surface of the electronic device 200. The surface surrounding the space between the front and back surfaces may be defined as a side surface of the electronic device 200.

According to an embodiment, the foldable housing 201 may include a first housing structure 210, a second housing structure 220, a first rear cover 215, a second rear cover 225, and a hinge structure 230. Here, the hinge structure 230 may include a hinge cover covering a foldable portion of the foldable housing 201. The foldable housing 201 of the electronic device 200 are not limited to the shape and coupling shown in FIGS. 2 and 3 but may rather be implemented in other shapes or via a combination and/or coupling of other components. For example, the first housing structure 210 and the first rear cover 215 may be integrally formed with each other, and the second housing structure 220 and the second rear cover 225 may be integrally formed with each other.

According to an embodiment, the first housing structure 210 may be connected to the hinge structure 230 and may include a first surface facing in a first direction and a second surface facing in a second direction opposite to the first direction. The second housing structure 220 may be connected to the hinge structure 230 and may include a third surface facing in a third direction and a fourth surface facing in a fourth direction opposite to the third direction. The second housing structure 220 may rotate about the hinge structure 230 from the first housing structure 210. The electronic device 200 may transform to a folded status or an unfolded status.

According to an embodiment, the first housing structure 210 may include a first side surface disposed to be spaced apart from and in parallel to the folding axis A of the hinge structure 230 between the first surface and the second surface, and the second housing structure 220 may include a second side surface disposed to be spaced apart from and in parallel to the folding axis A of the hinge structure 230 between the third surface and the fourth surface. Further, the first housing structure 210 may include a third side surface perpendicular to the first side surface and having an end connected with the first side surface and the other end connected with the hinge structure 230 and a fourth side surface perpendicular to the first side surface and having an end connected with the first side surface and the other end connected with the hinge structure 230 and spaced apart from and in parallel to the third side surface. The second housing structure 220 may include a fifth side surface perpendicular to the second side surface and having an end connected with the second side surface and the other end connected with the hinge structure 230 and a sixth side surface perpendicular to the second side surface and having an end connected with the second side surface and the other end connected with the hinge structure 230 and spaced apart from and in parallel to the fifth side surface. When the second housing structure 220 is folded to the first housing structure 210 on the hinge assembly 230, the first side surface may approach the second side surface and, when the second housing structure 220 is unfolded from the first housing structure 210 on the hinge structure 230, the first side surface may move away from the second side surface.

According to an embodiment, in the fully folded state of the electronic device 200, the first surface of the electronic device 200 may face the third surface and, in the fully unfolded state, the first surface and the third surface may be positioned on substantially the same plane. That the first surface and the third surface are positioned on substantially the same plane may refer, for example, to the first direction and the third direction facing in the same direction. In the fully unfolded state, the distance between the first side surface and the second side surface may be the largest.

According to an embodiment, the first housing structure 210 and the second housing structure 220 may be disposed on both sides of the folding axis A, and may have an overall symmetrical shape with respect to the folding axis A. As described below, the angle or distance between the first housing structure 210 and the second housing structure 220 may be varied depending on whether the electronic device 200 is in the unfolded state, the folded state, or the partially unfolded (or partially folded) intermediate state. According to an embodiment, unlike the second housing structure 220, the first housing structure 210 may further include the sensor area 222 where various sensors are disposed, but in the other areas, the arrangement, shape, and size of the sensor area 222 which may have a symmetric shape are not limited to the example shown. For example, in an embodiment, the sensor area 222 may be provided in a different corner of the first housing structure 210 or in any area between the top corner and the bottom corner. According to an embodiment, in the first housing structure 210, the sensor area 222 may be omitted or may be formed in a position different from that shown in the drawings. For example, unlike the embodiment of FIG. 2 in which the sensor area is formed in the first housing structure 210, the second housing structure 220 may additionally or alternatively include a sensor area where various sensors are disposed. In an embodiment, components for performing various functions, embedded in the electronic device 200, may be exposed through the sensor area 222 or one or more openings in the sensor area 222 to the front surface of the electronic device 200. In various embodiments, the components may include various kinds of sensors. The sensor may include at least one of, e.g., a front-facing camera, a receiver, or a proximity sensor. According to an embodiment, at least a portion of the first housing structure 210 and the second housing structure 220 may be formed of a metal or a non-metal material having a predetermined degree of rigidity to support the display 250. At least a portion formed of metal may provide a ground plane of the electronic device 200 and may be electrically connected with a ground line formed on the printed circuit board disposed in the foldable housing 201.

According to an embodiment, the first rear cover 215 may be disposed on one side of the folding axis A on the rear surface of the electronic device 200 and have, e.g., a substantially rectangular periphery which may be surrounded by the first housing structure 210. Similarly, the second rear cover 225 may be disposed on the opposite side of the folding axis A on the rear surface of the electronic device 200 and its periphery may be surrounded by the second housing structure 220.

According to an embodiment, the first rear cover 215 and the second rear cover 225 may be substantially symmetrical in shape with respect to the folding axis A. However, the first rear cover 215 and the second rear cover 225 are not necessarily symmetrical in shape. In an embodiment, the electronic device 200 may include the first rear cover 215 and the second rear cover 225 in various shapes. According to an embodiment, the first rear cover 215 may be integrally formed with the first housing structure 210, and the second rear cover 225 may be integrally formed with the second housing structure 220.

According to an embodiment, the first rear cover 215, the second rear cover 225, the first housing structure 210, and the second housing structure 220 may form a space where various components (e.g., a printed circuit board or battery) of the electronic device 200 may be disposed. According to an embodiment, one or more components may be arranged or visually exposed on/through the rear surface of the electronic device 200. For example, at least a portion of a sub display may be visually exposed through a first rear surface area 216 of the first rear cover 215. In an embodiment, one or more components or sensors may be visually exposed through a second rear surface area 226 of the second rear cover 225. According to various embodiments, the sensor may include a proximity sensor and/or a rear-facing camera.

According to an embodiment, a front camera exposed to the front surface of the electronic device 200 through one or more openings prepared in the sensor area 212 or a rear camera exposed through a second rear surface area 226 of the second rear cover 225 may include one or more lenses, an image sensor, and/or an image signal processor. The flash may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 200.

Referring to FIG. 3, the hinge cover may be disposed between the first housing structure 210 and the second housing structure 220 to hide the internal components (e.g., the hinge structure 230). According to an embodiment, the hinge structure 230 may be hidden by a portion of the first housing structure 210 and second housing structure 220 or be exposed to the outside depending on the state (e.g., the unfolded state, intermediate state, or folded state) of the electronic device 200.

According to an embodiment, as shown in FIG. 2, in the unfolded state (e.g., a fully unfolded state) of the electronic device 200, the hinge structure 230 may be hidden not to be exposed by the first housing structure 210 and the second housing structure 220. As another example, as shown in FIG. 3, in the folded state (e.g., a fully folded state) of the electronic device 200, the hinge structure 230 may be exposed to the outside between the first housing structure 210 and the second housing structure 220. As another example, in an intermediate state in which the first housing structure 210 and the second housing structure 220 are folded with a certain angle, the hinge structure 230 may be partially exposed to the outside between the first housing structure 210 and the second housing structure 220. In this case, however, the exposed area may be smaller than in the fully folded state. According to an embodiment, the hinge structure 230 may include a curved surface.

According to an embodiment, the display 250 may be disposed in a space formed by the foldable housing 201. For example, the display 250 may be seated in a recess formed by the foldable housing 201 and may be seen from the outside through the front surface of the electronic device 200. For example, the display 250 may include most of the front surface of the electronic device 200. Thus, the front surface of the electronic device 200 may include the display 250 and a partial area of the first housing structure 210 and a partial area of the second housing structure 220, which are adjacent to the display 250. The rear surface of the electronic device 200 may include the first rear cover 215, a partial area of the first housing structure 210, which is adjacent to the first rear cover 215, the second rear cover 225, and a partial area of the second housing structure 220, which is adjacent to the second rear cover 225.

According to an embodiment, the display 250 may refer, for example, to a display at least a portion of which may be transformed into a flat or curved surface. According to an embodiment, the display 250 may include a folding area 253, a first area 251 disposed on one side of the folding area 253 (e.g., the left side of the folding area 253 of FIG. 2), and a second area 252 disposed on the opposite side of the folding area 253 (e.g., the right side of the folding area 203 of FIG. 2).

However, the segmentation of the display 250 as shown in FIG. 2 is merely an example, and the display 250 may be divided into a plurality of (e.g., four or more, or two) areas depending on the structure or function of the display 200. For example, in the embodiment illustrated in FIG. 2, the area of the display 250 may be divided by the folding area 253 extending parallel to the folding axis A, but in an embodiment, the area of the display 250 may be divided by another folding axis (e.g., a folding axis parallel to the width direction of the electronic device).

According to an embodiment of the disclosure, the display 250 may be coupled with or disposed adjacent to a touch panel equipped with a touch detection circuit or a pressure sensor capable of measuring the strength (pressure) of a touch. For example, the display 250 may be disposed adjacent to or coupled with a touch panel, as an example of the touch pane, which detects a stylus pen of an electromagnetic resonance (EMR) type.

According to an embodiment, the first area 251 and the second area 252 may be overall symmetrical in shape with respect to the folding area 253. The second area 252 may include a notch depending on the presence of the sensor area 212, but the rest may be symmetrical in shape with the first area 251. In other words, the first area 251 and the second area 252 may include symmetrical portions and asymmetrical portions.

Described below are the operation of the first housing structure 210 and the second housing structure 220 and each area of the display 250 depending on the state (e.g., the folded state, unfolded state, or intermediate state) of the electronic device 200.

According to an embodiment, when the electronic device 200 is in the unfolded state (e.g., FIG. 2), the first housing structure 210 and the second housing structure 220 may be disposed to face in the same direction while being angled at 180 degrees therebetween. The surface of the first area 251 and the surface of the second area 252 of the display 250 may be angled at 180 degrees therebetween while facing in the same direction (e.g., forward of the front surface of the electronic device). The folding area 253 may be coplanar with the first area 251 and the second area 252.

According to an embodiment, when the electronic device 200 is in the folded state (e.g., FIG. 3), the first housing structure 210 and the second housing structure 220 may face each other. In the folded state, the surface of the first area 251 and the surface of the second area 252 of the flexible display 250 may be angled at a small angle (e.g., ranging from 0 degrees to 10 degrees) therebetween while facing each other. At least a portion of the folding area 253 may have a curved surface with a predetermined (e.g., specified) curvature.

According to an embodiment, in the intermediate state of the electronic device 200, the first housing structure 210 and the second housing structure 220 may be arranged at a certain angle therebetween. In the intermediate state, the surface of the first area 251 of the display 250 and the surface of the second area 252 may form an angle which is larger than the angle in the folded state and smaller than the angle in the unfolded state. In the intermediate state, the folding area 253 may at least partially have a curved surface with a predetermined curvature and, in this case, the curvature may be smaller than that when it is in the folded state.

The display 250 may display images or videos to the outside of the electronic device through the window glass stacked on one surface of the display 250. The window glass may include a folding portion formed in a position corresponding to the folding area 253 of the display. The folding portion may be formed to be thinner than the other surrounding portions (e.g., the flat portion). The need to form a thin folding portion has been previously described in the background above. An embodiment of forming a folding portion and a gentle slope at the boundary of the folding portion are described below in detail.

Figure 4:
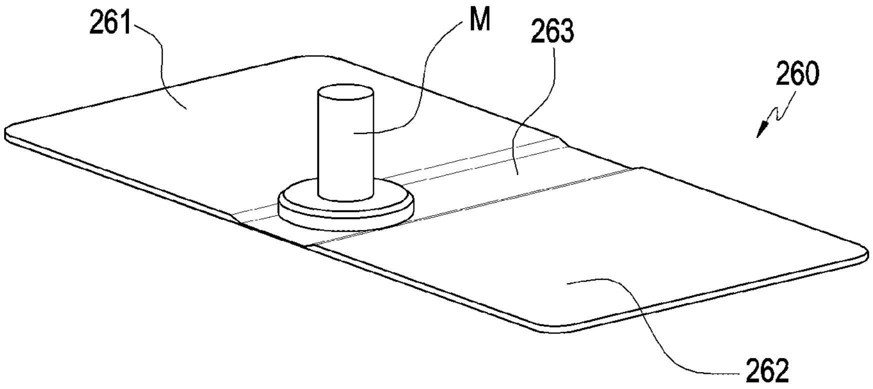
FIG. 4 is a schematic view illustrating a mechanical processing method for forming a folding portion.
Figure 5:
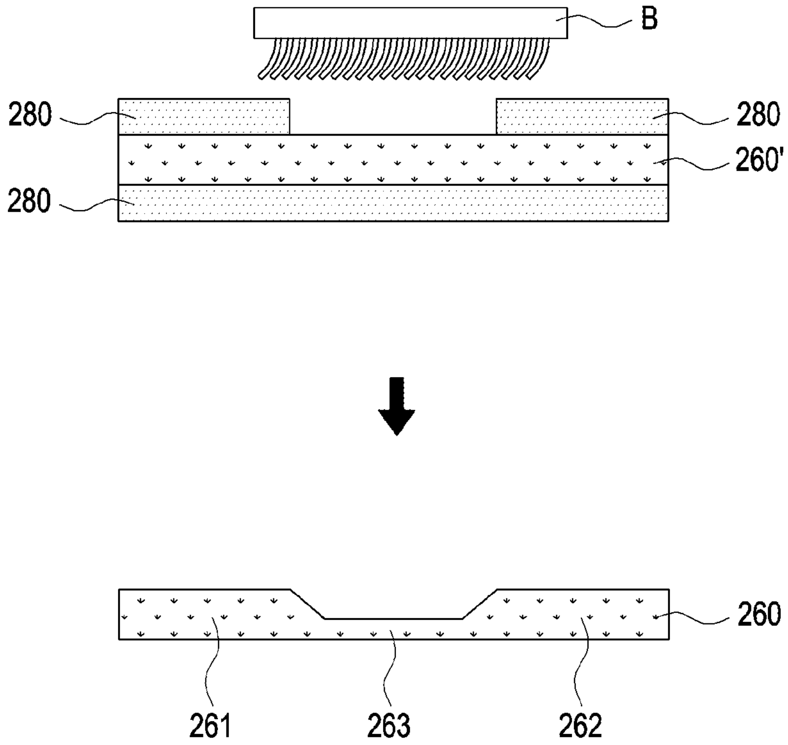
FIG. 5 is a schematic view illustrating a mechanical processing method for forming a folding portion according to an embodiment different from that of FIG. 4.
Figure 6:
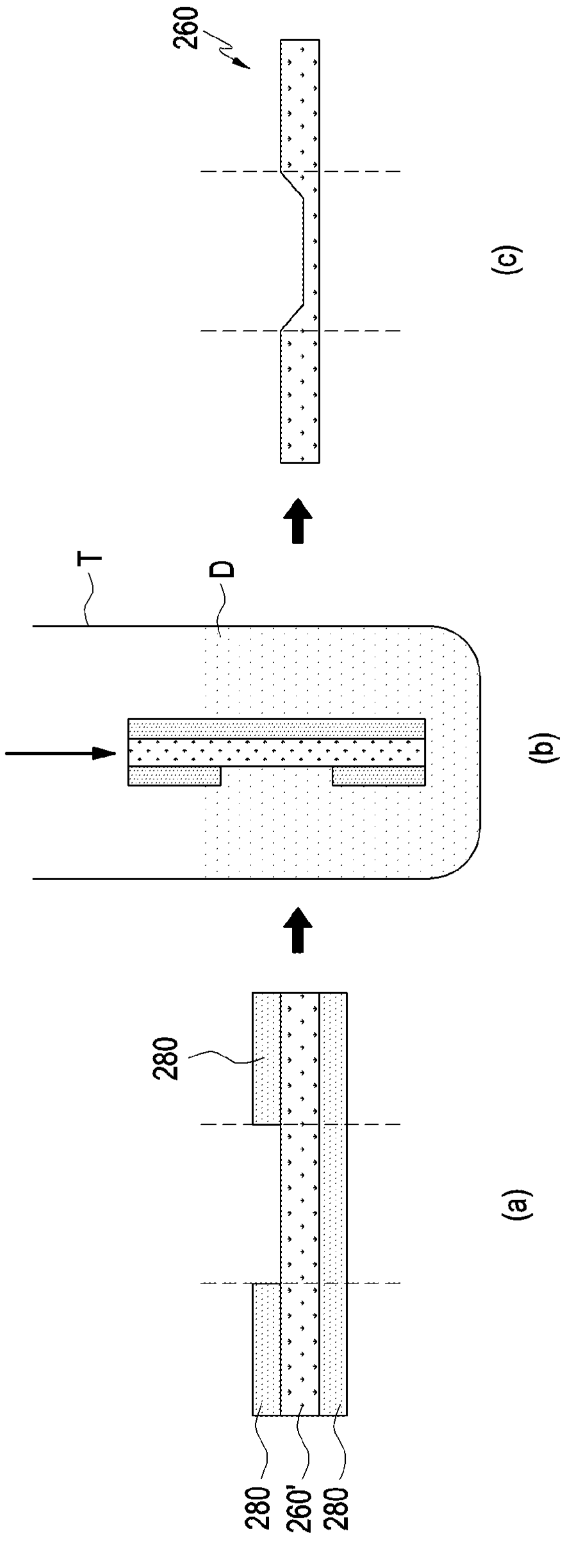
FIG. 6 is a schematic view illustrating a chemical processing method for forming a folding portion.

FIG. 4 is a schematic view illustrating a mechanical processing method for forming a folding portion. FIG. 5 is a schematic view illustrating a mechanical processing method for forming a folding portion according to an embodiment different from that of FIG. 4. FIG. 6 is a schematic view illustrating a chemical processing method for forming a folding portion.

FIG. 4 illustrates an example of mechanical processing method using a CNC tool M as a method for thinning the folding portion. Referring to FIG. 4, a CNC tool M may be positioned to cut the surface of the window glass 260 to a predetermined depth and be linearly moved in a direction parallel to the length or width direction of the window glass 260, forming a folding portion 263. The folding portion 263 may have a smaller thickness than the flat portions 261 and 262 by a preset depth of the CNC tool M. FIG. 5 illustrates an example of forming a folding portion 263 using a brush B as a mechanical processing method according to an embodiment different from that of FIG. 4. Referring to FIG. 5, a masking layer 280 may be stacked on at least one surface of a window glass base material 260', and a pattern (e.g., a groove) for forming a folding portion 263 may be formed in the masking layer 280, and then, the window glass base member 260' may be cut in the position corresponding to the pattern by the brush B, forming a folding portion 263.

According to various embodiments of the present disclosure, the window glass base material 260 ' may mean the window glass 260 without the folding portion 263 formed thereon, merely. The window glass base material 260' may be a raw material for manufacturing the window glass 260 or may be a material that has been implemented to predetermined chemical and/or physical processing. In the following description, the window glass base material 260' and the window glass 260 may be substantially the same, and may be referred to interchangeably depending on embodiments. For example, to make it easier to explain, in the initial stage of the operation of forming the folding portion 263, the member on which the folding portion 263 is formed may be referred to as a window glass base material 260', and in the final stage of the operation of forming the folding portion 263, the member on which the folding portion 263 is formed may be referred to as the window glass 260. In an intermediate stage between the initial stage and the final stage of the operation of forming the folding portion 263, the terms of the window glass base material 260' and the window glass 260 may be used interchangeably.

By the mechanical processing method of FIGS. 4 and 5, physical impact may be applied to the surface of the window glass 260, causing the surface of the window glass 260 to be torn or cracked, and growing cracks.

FIG. 6 illustrates an example of chemical etching method as a method for forming a thin folding portion. Referring to FIG. 6, before performing a chemical etching method, a masking layer 280 may be stacked on at least one surface of the window glass base material 260', and a pattern (e.g., a groove) may be formed to represent a boundaries (denoted by a dashed line in FIG. 6) between the folding portion 263 and the flat portions 261 and 262. Thereafter, the window glass base material 260' stacked with the patterned masking layer 280 may be dipped in a water tank T containing etching solution D to remove the masking layer 280, thereby forming a folding portion 263. In this case, the portion exposed to the solution by patterning the masking layer 280 in the window glass 260 may be etched earlier than the peel-off of the masking layer 280, so that a folding portion 263 thinner than the flat portions 261 and 262 may be formed. Here, the used etching solution D may be, e.g., a solution in which a fluorine-based compound is dissolved, such as hydrofluoric acid/fluorosilicic acid/ammonium fluoride, or a mixture of a solution in which a fluorine-based compound is dissolved and an acid (hydrofluoric acid/sulfuric acid/hydrochloric acid, etc.).

According to the chemical processing method of FIG. 6, no physical impact is applied to the surface of the window glass 260 in the process of forming the folding portion 261, and the probability of occurrence of cracks may be reduced. However, as the slope at the boundary between the portion where the masking layer 280 is formed (e.g., the flat portions 261 and 262) and the folding portion 263 may be steep, external visibility of the boundary may be increased.

Accordingly, there are provided various example embodiment disclosing a window glass that is less likely to cause cracks and prevents/reduces the folding portion boundary from being visible to the naked eye and an electronic device including the same which are described in greater detail below with reference to FIGS. 7A, 7B, 8, 9, 10, 11 12, 13A and 13B (which may be referred to as FIGS. 7A to 13B).

In the following detailed description, the width direction and/or thickness direction (height direction) of the window glass and electronic device may be mentioned, and the width direction may be referred to as an 'X-axis direction' and/or the thickness direction may be referred to as a 'Z-axis direction.' Although not shown in the drawing, the length direction of the window glass and the electronic device may form a spatial coordinate system as well as the orthogonal coordinate system shown in the drawings. It should be noted that the directions are so defined with respect to the Cartesian coordinate system shown in the drawings for the sake of brevity of description and/or for a better understanding of various embodiments of the disclosure, and the description of these directions or components do not limit various embodiments of the disclosure.

Figure 7A:
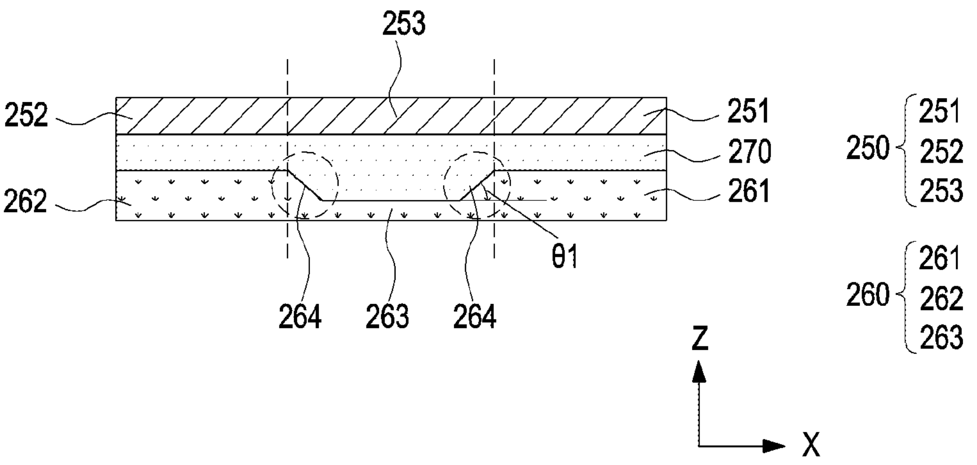
FIG. 7A is a view illustrating a stacked member of a display and a window glass according to an embodiment (comparative embodiment)
Figure 7B:
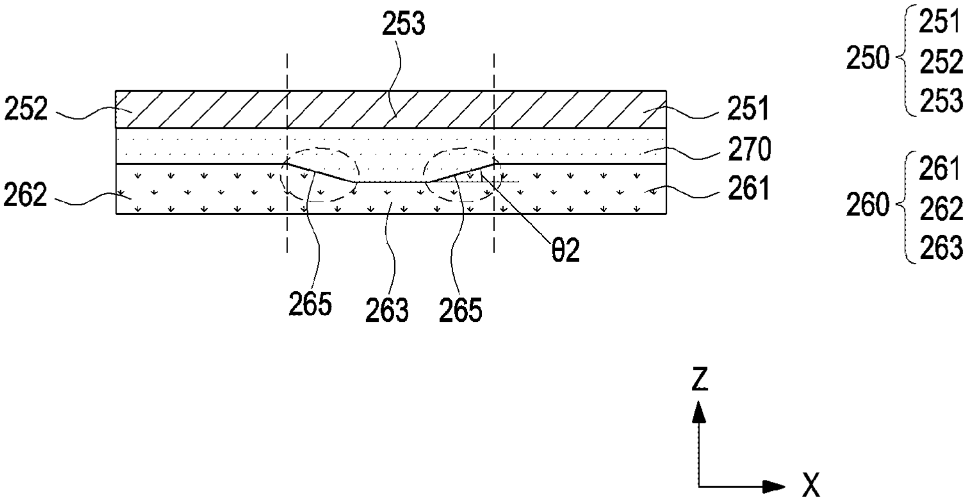
FIG. 7B is a view illustrating a stacked member of a display and a window glass according to an embodiment of the disclosure.

FIG. 7A is a view illustrating a stacked member of a display and a window glass according to an embodiment (comparative embodiment). FIG. 7B is a view illustrating a stacked member of a display and a window glass according to an embodiment of the disclosure.

FIG. 7A illustrates a stacked member of a display and a window glass formed with a slope 264 having a steep slope angle, and FIG. 7B may illustrate a stacked member of a display and a window glass formed with a slope 265 having a relatively gentle slope angle.

According to an embodiment of the disclosure, an electronic device (e.g., the electronic device 101 of FIG. 1 or the electronic device 200 of FIGS. 2 and 3) may include a display 250, a window glass 260 stacked with the display 250, and an adhesive member (e.g., including an adhesive material) 270 disposed between the display 250 and the window glass 260.

The window glass 260 may include a first portion having a predetermined thickness and a second portion having a thickness smaller than the first portion. According to an embodiment, the first portion 261 and 262 may include two flat portions 261 and 262 having a predetermined thickness, and the second portion may include a folding portion 263 positioned between the two flat portions. In FIGS. 7A and 7B and the drawings described below, a foldable window glass 260 is described as an example in the disclosure. Accordingly, according to an embodiment of the disclosure, for convenience of description, the first portion of the window glass 260 may be referred to as 'flat portions 261 and 262', and the second portion may be referred to as 'folding portion 263.'

The adhesive member 270 may include an adhesive material and serve to fill a space between the display 250 and the window glass 260 while adhering the display 250 and the window glass 260 to each other. The adhesive member 270 may be, e.g., optically clear adhesive (OCA), optically clear resin (OCR), and/or pressure sensitive adhesive (PSA), but is not limited thereto.

Referring to FIGS. 7A and 7B, the display 250 may be formed by being stacked with the window glass 260. Here, the display 250 may include a first area 251 disposed on one side of the folding area 253 and a second area 252 disposed on the other side of the folding area 253. The window glass 260 may include the folding portion 263 disposed in the position corresponding to the folding area 253 and a first flat portion 261 and a second flat portion 262 disposed in the positions corresponding to the first area 251 and the second area 252, respectively, of the display 250. In this case, the first flat portion 261 and the second flat portion 262 may have substantially the same thickness. According to an embodiment, the first flat portion 261 and the second flat portion 262 may be formed to have a first thickness, and the folding portion 263 may be formed to have a second thickness smaller than the first thickness. For example, the first flat portion 261 and the second flat portion 262 may be formed to have a thickness of 50 μm to 300 μm as the first thickness. The folding portion 263 may be formed to have a thickness of 5 μm to 50 μm as the second thickness. However, these values are merely example, and other thicknesses may be applied.

Referring to FIGS. 7A and 7B, at cross-sectional view of the display 260, the adhesive member 270, and the window glass 260, as the folding portion 263 has a thickness smaller than the first flat portion 261 and the second flat portion 262, a step may be formed between the folding portion 263 and the first and second flat portions 261 and 262, and the step may serve as a recess filled with the adhesive member 270. According to an embodiment, the start point of the boundary between the folding portion 263 and the first flat portion 261 and the start point of the boundary between the folding portion 263 and the second flat portion 262 are shown by dashed lines parallel to the Z axis in the embodiment shown in FIGS. 7A and 7B.

A slope with a predetermined angle may be formed at the boundary between the folding portion 263 and the first flat portion 261 and at the boundary between the folding portion 263 and the second flat portion 262. FIG. 7A illustrates a slope 264 with a steep slope angle (e.g., a first slope angle θ1) (hereinafter, referred to as a 'steep slope 264'), and FIG. 7B illustrates a slope 265 with a relatively gentle slope angle (e.g., a second slope angle θ2) (hereinafter, referred to as a 'gentle slope 265'). In other words, the second slope angle θ2 may be smaller than the first slope angle θ1. In the window glass manufactured by the conventional, well-known chemical processing method, a steep slope may be formed at the boundary between the masked portion and the unmasked portion. For example, according to the chemical processing method mentioned in FIG. 6, as shown in FIG. 7A, a slope with a steep slope angle as compared with the embodiment of FIG. 7B may be formed. Here, the steep slope 264 may have a slope angle of about 10 degrees. In the case of having such a second slope angle, the boundary may easily be observed from the outside when the adhesive member 270 is applied. In contrast, the electronic device including the stacked member of the display 260 and the window glass 260 according to the embodiment shown in FIG. 7B is formed to have a gentle slope angle as compared with the electronic device including the stacked member of the display 260 and the window glass 260 according to the embodiment of FIG. 7A and may be less likely to be visible to the naked eye. In other words, as in the embodiment of FIG. 7B, the gentler the slope angle of the slope is, the less likely it is to be visible to the naked eye. As a method for forming a gentle slope angle of a slope, it may be considered to increase the area of the folding portion 263, but this method may be limited by the specifications, e.g., restoring force required for the window glass. Thus, a need may exist for a method for forming the gentle slope 265 while maintaining the area of the folding portion 263 constant.

In the examples of FIGS. 8, 9, 10, 11, 12, 13A, 13B and 14, various examples of a method for forming a gentle slope 265 while maintaining the area of the folding portion 263 constant are described below in detail. The following embodiment relates to a stacked structure of a display 250 and a window glass 260, which has a minimized/reduced gentle slope 265 (e.g., at least 3 degrees or less) in a state in which, e.g., a first flat portion 261 and a second flat portion 262 are formed to have a thickness of 50 μm to 300 μm as a first thickness, and a folding portion 263 is formed to have a thickness of 5 μm to 50 μm as a second thickness, and an electronic device including the same.

Figure 8:
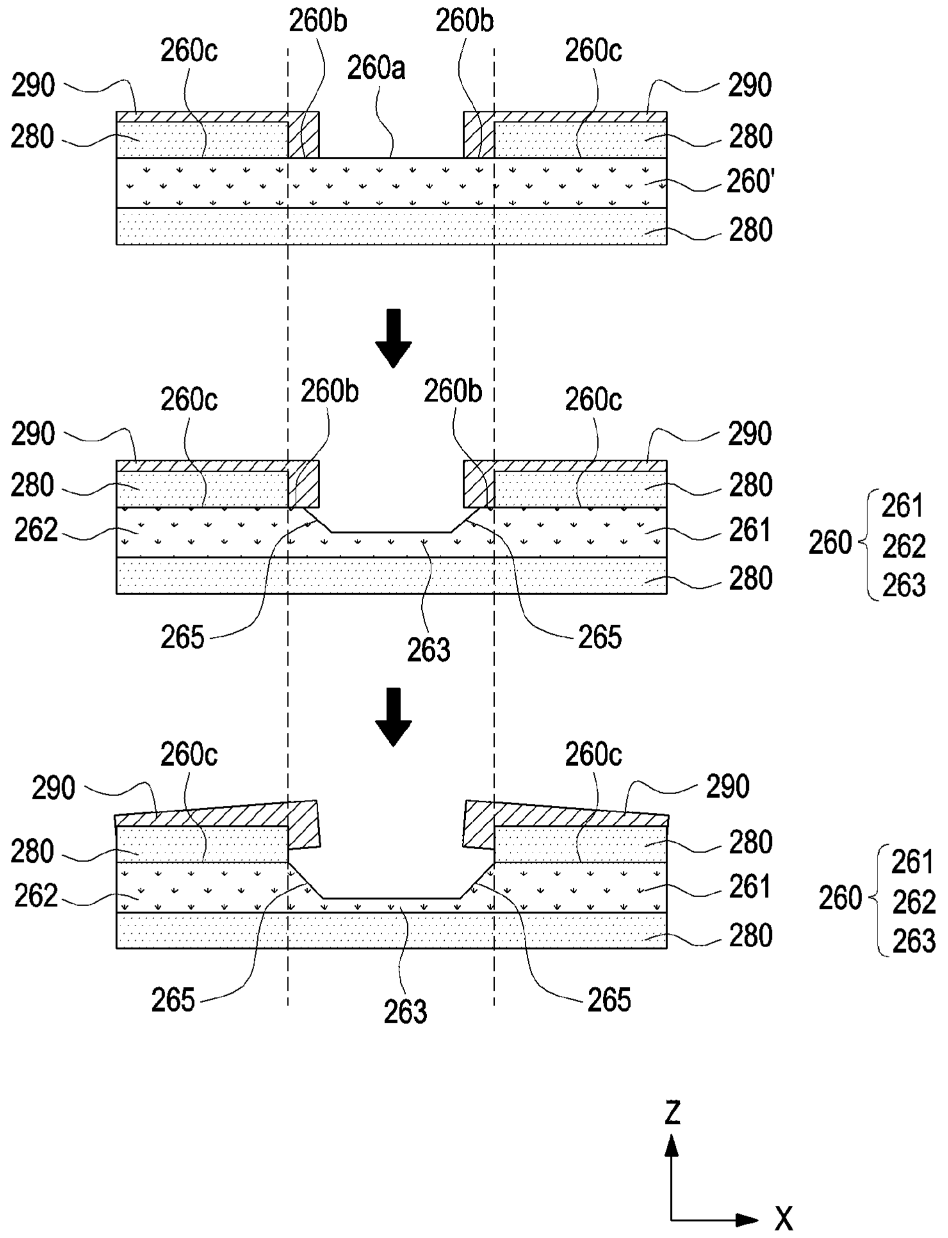
FIG. 8 is a view illustrating a method for manufacturing a window glass with a gentle slope according to an embodiment of the disclosure.

FIG. 8 is a view illustrating a method for manufacturing a window glass 260 with a gentle slope 265 according to an embodiment.

Referring to FIG. 8, a method for manufacturing a window glass 260 having a gentle slope 265 may include at least some processes of the chemical processing method described above in connection with FIG. 6. For example, the window glass 260 having the gentle slope 265 of FIG. 8 may be manufactured by a chemical etching method to dip a stacked member of the window glass 260 and a masking layer 280 in an etching solution (e.g., the etching solution D of FIG. 6) in a state in which the masking layer 280 is formed on at least one surface of the window glass 260. Meanwhile, the embodiment of FIG. 8 may differ from the embodiment as described in connection with FIG. 6 in that it performs chemical etching in a state of further including a separate second masking layer 290. For reference, in the following description, the masking layer 280 may be referred to as a first masking layer 280 to be clearly distinguished from the second masking layer 290.

According to an embodiment of the disclosure, before performing chemical etching, the first masking layer 280 may be stacked on at least one surface of the window glass 260. The first masking layer 280 may be formed of an ink or film material and be finally peeled off by chemical etching performed later. A pattern for setting boundaries (dashed lines) between the folding portion 263 and the flat portions 261 and 262 may be formed in a state in which the first masking layer 280 is stacked on at least one surface of the window glass 260.

Referring to FIG. 8, in the window glass 260 of the disclosure, a second masking layer 290 overlapping the first masking layer 280 may further be stacked. According to an embodiment, the second masking layer 290 may be formed to surround the first masking layer 280. In this case, at least a portion of the second masking layer 290 may overlap the first masking layer 280 (and/or the flat portions 261 and 262) while at least another portion may be stacked on the folding portion 263 beyond the boundary (dashed line).

The second masking layer 290 may be formed of an ink material, be a component to be finally peeled off by chemical etching like the first masking layer 280, and be configured of a material having a lower chemical resistance than the first masking layer 280. For example, the second masking layer 290 may be formed of a material having a higher monomer content than the first masking layer 280, and the first masking layer 280 may be formed of a material having a higher oligomer content than the second masking layer 290. Since the second masking layer 290 is formed of a material having lower chemical resistance than the first masking layer 280, the second masking layer 290 may be peeled off earlier than the first masking layer 280 during chemical etching. According to an embodiment, in chemical etching, the solution for etching the glass and the solution for etching the masking layer may differ from each other. In this case, the first masking layer 280 may be formed of a material that is not etched by the solution for etching the glass, and the second masking layer 290 may be formed of a material that may be etched by the solution for etching the glass. The first masking layer 280 may be formed of an ink or film material, and the second masking layer 290 may be formed of an ink material. For example, the window glass 260 may be formed using the first masking layer 280 formed of a film material and the second masking layer 290 formed of an ink material. According to an embodiment, the window glass 260 may be formed using the first masking layer 280 and the second masking layer 290 both formed of an ink material. Here, the ink used to form the masking layer may be acrylic ink, urethane ink, or ink formed of a mixture of acrylic ink and urethane ink. According to an embodiment, when both the first masking layer 280 and the second masking layer 290 are formed of an ink material, the ink forming the first masking layer 280 and the second masking layer 290 forming the second masking layer 290 may be the same series of inks. For example, both the first masking layer 280 and the second masking layer 290 may be formed of acrylic ink.

In some steps of the manufacturing process, the window glass 260 may include a first surface 260*a* that does not overlap other components including the first masking layer 280 and the second masking layer 290 and is itself exposed to the outside, a second surface 260*b* overlapping the second masking layer 290, and a third surface 260*c* overlapping the first masking layer 280. According to an embodiment, the second surface 260*b* does not overlap the first masking layer 280 but may overlap the second masking layer 290 alone. According to an embodiment, the third surface 260*c* may overlap the first masking layer 280 and may also overlap the second masking layer 290 stacked on the first masking layer 280. According to an embodiment of the disclosure, the window glass 260 may form a gentle slope using at least two or more masking layers with different chemical resistance properties. As shown in FIG. 8, if the stacked member of the window glass 260 and the first and second masking layers 280 and 290 is dipped in the water tank containing the etching solution, the first surface 260*a* which is not surrounded by the first and second masking layers 280 and 290 in the window glass 260 but exposed as it is may first be etched. While the first surface 260*a* of the window glass 260 is etched by the etching solution, the second masking layer 290 may be peeled off. In this case, the portion of the second masking layer 290, which contacts the second surface 260*b* of the window glass 260 may first be peeled off, and the portion stacked with the first masking layer 280 may then be peeled off. Such peel-off may be gradually and/or slowly performed in proportion to the time when it is dipped in the etching solution. As the second masking layer 290 is slowly peeled off, the second surface 260*b* of the window glass 260 contacting and hidden by the second masking layer 290 may be exposed to the solution and thus be etched. The first masking layer 280 having higher chemical resistance than the second masking layer 290 is not peeled off by the etching solution and protect the window glass 260. The etching work on the stacked member of the window glass and the first and second masking layers 280 and 290 may be diversified according to embodiments, but typically, it may be terminated before the third surface 260*c* overlapping the first masking layer 280 is etched. FIG. 8 illustrates a state in which the third surface 260*c* overlapping the first masking layer 280 is not etched. Referring to FIG. 8, since the first surface 260*a* of the window glass 260 first exposed to the etching solution and the second surface 260*b* of the window glass 260 which was covered by the second masking layer 290 but is slowly exposed as the second masking layer 290 is peeled off have different times when they are exposed to the etching solution, the first surface 260*a* and the second surface 260*b* may be etched in different quantities when the step of dipping the stacked member of the window glass 260 and the first and second masking layers 280 and 290 in the etching solution is terminated. As the second masking layer 290 is gradually and/or slowly peeled off to the first masking layer 280 while bonded to the second surface 260*b* of the window glass 260, the boundary between the first surface 260*a* and second surface 260*b* of the window glass 260 may be prevented/inhibited from being formed in a stepped shape. Thus, a gentle slope 265 with a designated slope angle or less may be formed around the folding portion 263 in the window glass 260. According to an embodiment, the designated slope angle may be set to 3 degrees or less. In other words, the window glass 260 may have a slope angle of 3 degrees or less around the folding portion 263. According to an embodiment, the designated angle of the window glass 260 may be set to 0.1 degrees to 3 degrees or less. Further, according to an embodiment, the designated angle of the window glass 260 may be set to 0.1 degrees to 1 degree or less. In this case, the gentle slope 265 may be formed in a straight line as shown in the drawings, but unlike shown in the drawings, it may be formed so that at least a portion thereof includes a curve.

According to various embodiments of the disclosure, the gentle slope 265 may be formed to have a slope angle of 3 degrees or less and be a single slope, rather than multiple slopes.

Embodiments for forming a single slope are described below with reference to FIG. 9.

Figure 9:
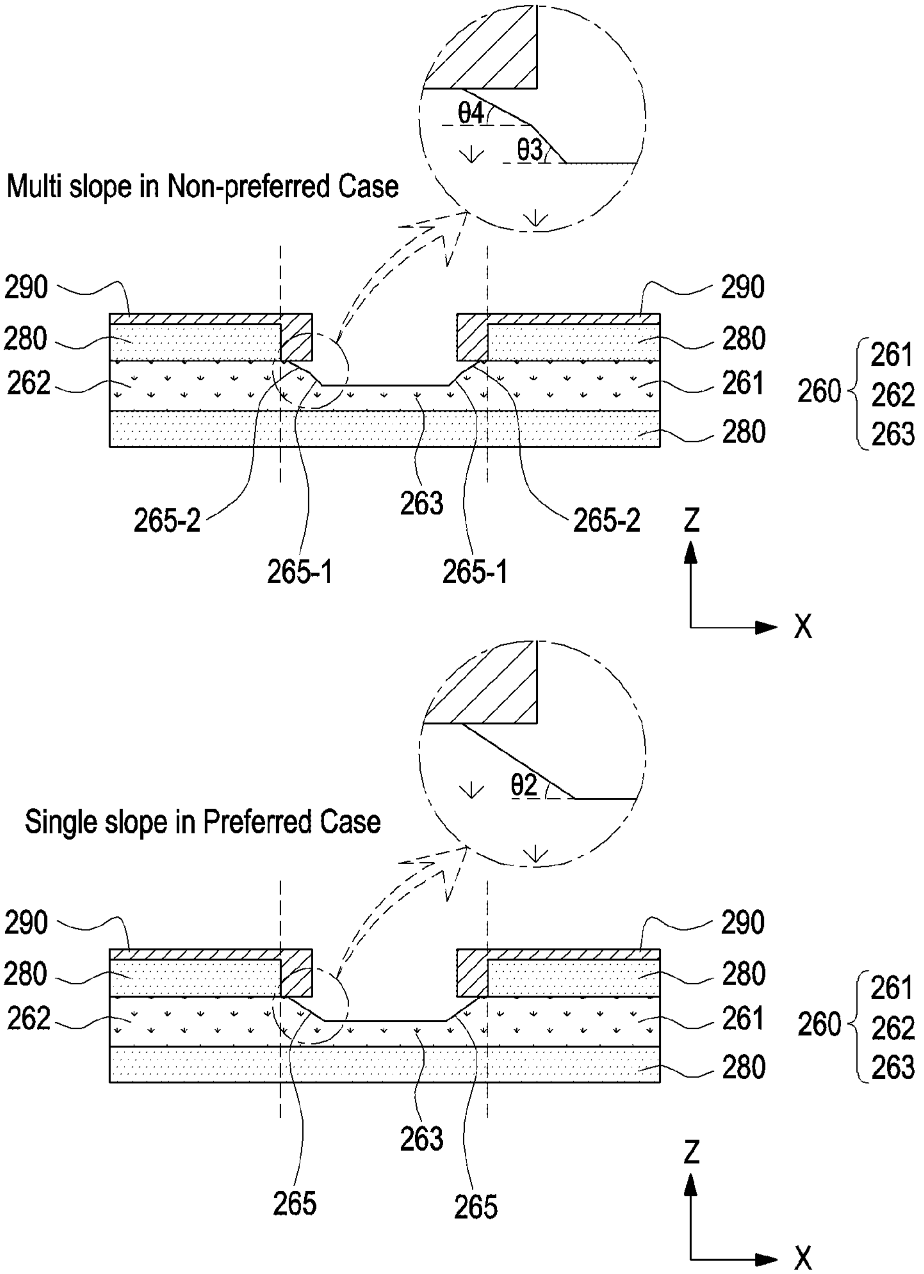
FIG. 9 is a view illustrating a window glass including a multi-slope according to a comparative embodiment and a window glass including a single slope according to an embodiment of the disclosure.

FIG. 9 is a view illustrating a window glass including a multi-slope according to a comparative embodiment and a window glass including a single slope according to an embodiment of the disclosure.

FIG. 9 illustrates a window glass including a multi-slope as a comparative embodiment (or non-preferred case) on the upper side and a window glass including a single slope as an embodiment (or preferred case compared to the non-preferred case) of the disclosure.

In the comparative embodiment (or non-preferred case), the window glass may include a first slope 265-1 forming an angle of θ3 from the folding portion 263 and a second slope 265-2 forming an angle of θ4 from the folding portion 263, as the multi-slope. In this case, the angle θ3 of the first slope 265-1 may be steeper (larger) than the angle θ4 of the second slope 265-2.

As described above in connection with FIG. 8, in relation to a method for manufacturing a window glass, it is possible to form a gentle slope using a time difference in peeling the first masking layer 280 and the second masking layer 290 but, in some cases, a multi-slope may be formed as in the comparative embodiment (or unpreferable embodiment). In some cases, the angle θ3 of the first slope 265-1 may be excessively large so that the boundary of the folding portion 263 may be visible. For example, as the angle θ3 of the first slope 265-1 is formed to have a slope of 5 degrees or less, the boundary of the folding portion 263 may be visible although the angle θ4 of the second slope 265-2 has a gentle slope of 1 degree or less.

To manufacture a window glass having a single slope (e.g., the gentle slope 265)(θ2) while preventing/inhibiting such a multi-slope, it is possible to adjust the acid value of the polymer functional group (e.g., ester) of the masking layer according to an embodiment of the disclosure.

According to an embodiment of the disclosure, a single slope with a gentle slope (e.g., the gentle slope 265)(θ2), rather than a multi-slope, may be formed by adjusting the peel-off time through adjustment of the acid value of the polymer functional group in the masking layer (e.g., the second masking layer 290). For example, the acidity (pH) of the masking layer including a urethane-based or acrylic-based ink material may be formed to be about 6.0. In the disclosure, it is possible to induce rapid peel-off by the etchant (e.g., acid etchant which is a mixture of ammonium fluoride and sulfuric acid) by lowering the acid value (H+) of the masking layer (e.g., the second masking layer 290) to decrease the acidity (e.g., increase the ph), thereby preventing/inhibiting the slope from being formed as a multi-slope.

The mechanism of adjusting the acid value of the masking layer for rapid peel-off may have a chemical formula 1 below.

[Chemical formula 1]

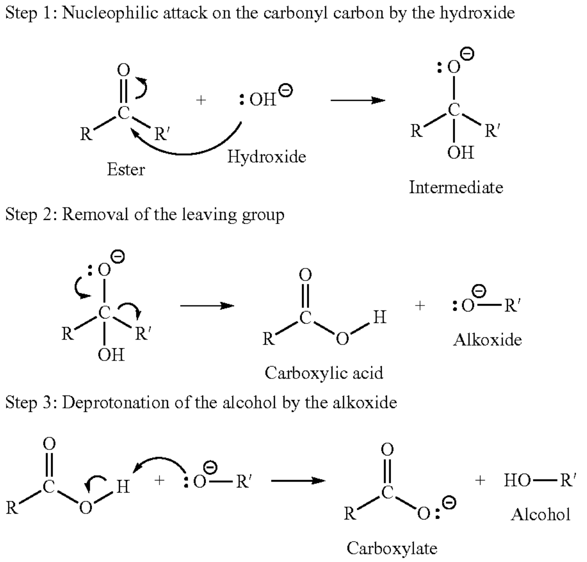

If the acidity of the masking layer is lowered, carbon in the ester may easily be bonded to the hydroxyl group, and accordingly, peel-off of the masking layer may occur more easily and quickly than usual. When the acidity of the masking layer increases, the hydroxyl group has a strong tendency to bond with hydrogen ions (H+), making it difficult to bond with carbon in the ester, and accordingly, leading to slower peel-off of the masking layer than usual.

In the disclosure, as a masking layer (e.g., the second masking layer 290) with a lower acidity than usual is used, it is possible to induce rapid peel-off of the masking layer (e.g., the second masking layer 290), thus providing a window glass with a single slope. For example, when a typical masking layer has an acidity of pH 6.0, the masking layer (e.g., the second masking layer 290) of the disclosure may have an acidity larger than pH 6.0.

Figure 10:
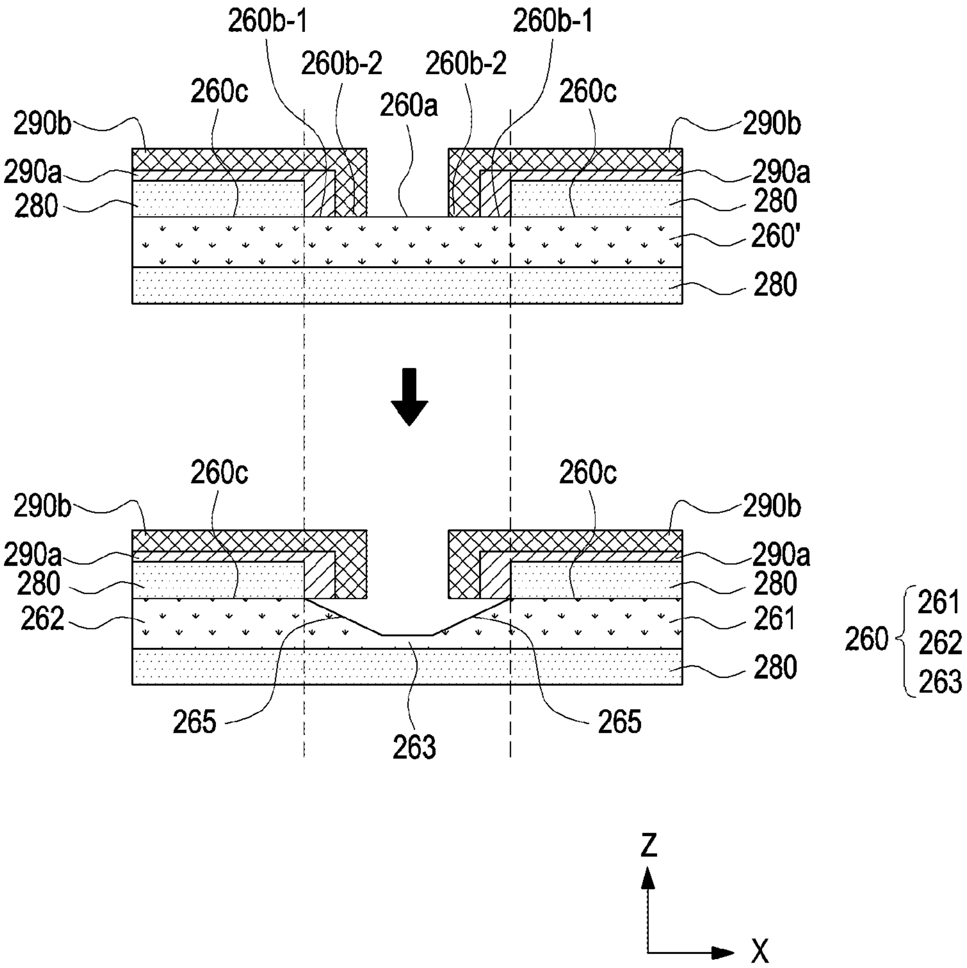
FIG. 10 is a view illustrating a method for manufacturing a window glass with a gentle slope according to an embodiment of the disclosure.

FIG. 10 is a view illustrating a method for manufacturing a window glass with a gentle slope according to an embodiment of the disclosure.

The embodiment of FIG. 10 may differ from the embodiment described above in connection with FIG. 9 in that chemical etching is performed in a state of further including an additional third masking layer 290*b*. For reference, in the description for FIG. 10, the second masking layer 290 may be referred to as a 'second masking layer 290*a*' to be clearly distinguished from the third masking layer 290*b*.

Referring to FIG. 10, according to an embodiment of the disclosure, the stacked member of the window glass 260 and the first and second masking layers 280 and 290*a* may include a third masking layer 290*b* additionally stacked on the second masking layer 290*a*. According to an embodiment, the third masking layer 290*b* may be formed to surround the first masking layer 280 and the second masking layer 290*a*. In this case, at least a portion of the third masking layer 290*b* may overlap the first masking layer 280 and/or the second masking layer 290*a* while at least another portion may be stacked on the window glass 260 having the folding portion 263 beyond the boundary (dashed line).

Like the first masking layer 280 and the second masking layer 290*a*, the third masking layer 290*b* may be a component that may finally be peeled off by chemical etching and be formed of a material having lower chemical resistance than the first masking layer 280 and the second masking layer 290*a*. For example, the third masking layer 290*b* may be formed of a material having a higher monomer content than the first masking layer 280 and the second masking layer 290*a*. As the third masking layer 290*b* is formed of a material having lower chemical resistance than the first masking layer 280 and the second masking layer 290*a*, the third masking layer 290*b* may be peeled off earlier than the first masking layer 280 and the second masking layer 290*a* during chemical etching.

According to the embodiment of FIG. 10, if the stacked member of the first masking layer 280, the second masking layer 290*a*, and the third masking layer 290*b* is dipped in the etching solution in the window glass 260, the third masking layer 290*b* may be peeled off first, then the second masking layer 290*a*, and lastly, the first masking layer 280 so that the surface of the window glass 260 may be etched.

In this case, the first surface 260*a* not surrounded by the first, second, and third masking layers 280, 290*a*, and 290*b* but exposed to the solution in the window glass 260 may be etched first, and the second surface 260*b* overlapping the third masking layer 290*b* and the second masking layer 290*a* may be etched. The portion 260*b*-2 overlapping the third masking layer 290*b*, of the second surface 260*b*, may be etched first, and the portion 260*b*-1 overlapping the second masking layer 290*a* may then be etched. According to an embodiment, the surface 260*c* overlapping the first masking layer 280 may be additionally etched, or may not be etched.

According to an embodiment, to implement a gentle slope 265, the third masking layer 290*b* may be formed of a material having lower chemical resistance than the second masking layer 290*a*, allowing the third masking layer 290*b* to be peeled off earlier than the second masking layer 290*a*.

In the embodiment of FIG. 10, as compared with the embodiment of FIG. 8, the third masking layer 290*b* may be further provided which has lower chemical resistance than the second masking layer 290*a*, making it possible to more finely adjust the etching speed of the surface of the window glass 260. In other words, in the window glass 260 according to the embodiment of FIG. 10, as compared with the window glass 260 according to the embodiment of FIG. 8, a slope 265 with a gentler slope angle may be implemented.

According to an embodiment, it is possible to manufacture a window glass 260 having a gentler slope 265 by further including N (where N is an integer of 1, 2, 3, . . . ) masking layers as well as the first, second, and third masking layers 280, 290*a*, and 290*b* shown in FIG. 9.

Figure 11:
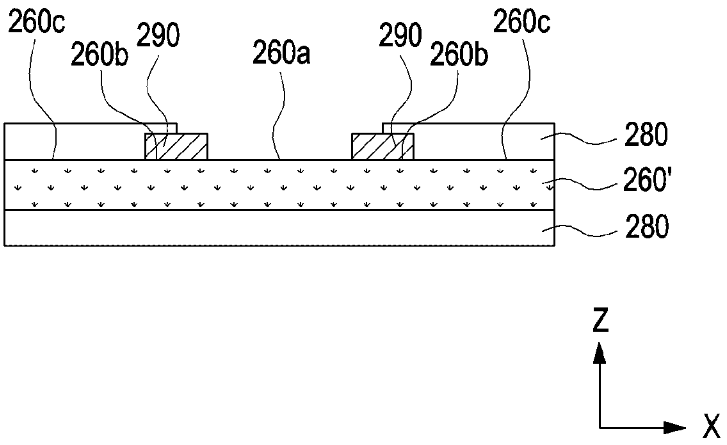
FIG. 11 is a view illustrating a window glass stacked member including a second masking layer according to an embodiment of the disclosure.
Figure 12:
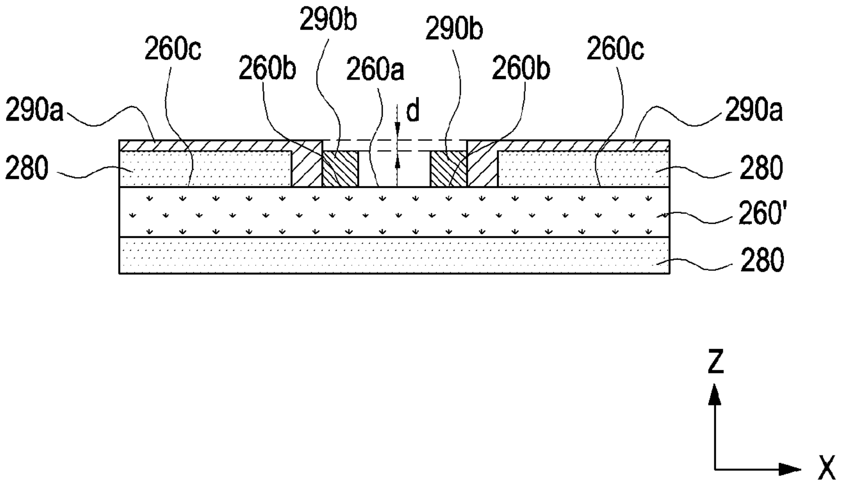
FIG. 12 is a view illustrating a window glass stacked member further including a third masking layer 290*b* according to an embodiment of the disclosure.

FIG. 11 is a view illustrating a stacked member of a window glass 260 including a second masking layer 290 according to an embodiment of the disclosure. FIG. 12 is a view illustrating a stacked member of a window glass 260 further including a third masking layer 290 according to an embodiment of the disclosure.

Embodiments of forming a stacked member between a plurality of masking layers 280 and 290 and a window glass 260 may be not limited to the above-described embodiments but may be diversified according to embodiments.

For example, as shown in FIG. 11, the first masking layer 280 and the second masking layer 290*a* both may be stacked on at least one surface of the window glass 260. Unlike in the embodiment described above in connection with FIG. 9, which includes the window glass 260 and the second masking layer 290*a* sequentially stacked on the first masking layer 280, in the embodiment of FIG. 11, the second masking layer 290*a* faces the window glass 260 while being not stacked on the first masking layer 280. According to an embodiment, the stacked member of the window glass 260 and the first and second masking layers 280 and 290 of FIG. 11 may be one obtained by stacking the second masking layer 290*a* on one surface of the window glass 260 followed by stacking the first masking layer 280. Alternatively, in contrast thereto, the stacked member of the window glass 260 and the first and second masking layers 280 and 290 of FIG. 11 may be one obtained by stacking the first masking layer 280 on one surface of the window glass 260 and then injecting a liquid second masking layer 290*a* (e.g., ink) into the space between the first masking layer 280 and the window glass 260 and then hardening it. In the embodiment of FIG. 11, the second masking layer 290 may be a component to be finally peeled off by chemical etching like the first masking layer 280, and be configured of a material having a lower chemical resistance than the first masking layer 280.

As another example, in a case where the third masking layer 290*b* is further included as shown in FIG. 12, the third masking layer 290*b* not overlapping the second masking layer 290*a* may be included. According to an embodiment, the third masking layer 290*b* may touch and contact one surface of the window glass 260 and be disposed closer to the folding axis (e.g., the folding axis A of FIG. 2) of the folding portion than the second masking layer 290*a* is. Further, the third masking layer 290*b* may be formed to have a smaller thickness than the second masking layer 290*a*. For example, as shown in FIG. 12, the third masking layer 290*b* may be formed to be stepped from the second masking layer 290*a* by 'd'. As the third masking layer 290*b* is made thinner than the second masking layer 290*a*, it is possible to increase the speed of peel-off from the etching solution. In the embodiment of FIG. 12, the second masking layer 290*a* may be a component that may finally be peeled off by chemical etching like the first masking layer 280 and be formed of a material having lower chemical resistance than the first masking layer 280. The third masking layer 290*b* may be formed of a material having low chemical resistance than the first masking layer 280 and the second masking layer 290*a*. Accordingly, the second masking layer 290*a* may be peeled off earlier than the first masking layer 280, and the third masking layer 290*b* may be peeled off earlier than the second masking layer 290*a*.

Table 1 below shows the peel-off times of masking layers having various thicknesses for certain etchants (ammonium fluoride and sulfuric acid compounds).

TABLE 1

| | etchant<br>ammonium fluoride 5% + sulfuric acid 10%<br>product (window glass stacked member) | | | |
|---|---|---|---|---|
| | #1(first embodiment) | #2(second embodiment) | #3(third embodiment) | #4(fourth embodiment) |
| masking layer thickness (μm) | 21 to 22 | 13 to 14 | 10 to 11 | 7 to 8 |
| peel-off time | 19 minutes | 9 minutes 30 seconds | 8 minutes 30 seconds | 7 minutes 40 seconds |

Referring to Table 1 above, it may be identified that in the case of a window glass stacked member stacked with a masking layer having a thickness of 21 μm to 22 μm, the peel-off time of the masking layer is measured as 19 minutes, in the case of a window glass stacked member stacked with a masking layer having a thickness of 13 μm to 14 μm, the peel-off time is measured as 9 minutes 30 seconds, in the case of a window glass stacked member stacked with a masking layer having a thickness of 10 μm to 11 μm, the peel-off time of the masking layer is measured as 8 minutes 30 seconds, and in the case of a window glass stacked member stacked with a masking layer having a thickness of 7 μm to 8 μm, the peel-off time of the masking layer is measured as 7 minutes 40 seconds. It is possible to form a gentle slope 265 using the differences in peel-off speed when stacking a plurality of masking layers on the surface of the window glass, based on such a characteristic that the peel-off speed increases as the thickness of the masking layer decreases.

Figure 13A:
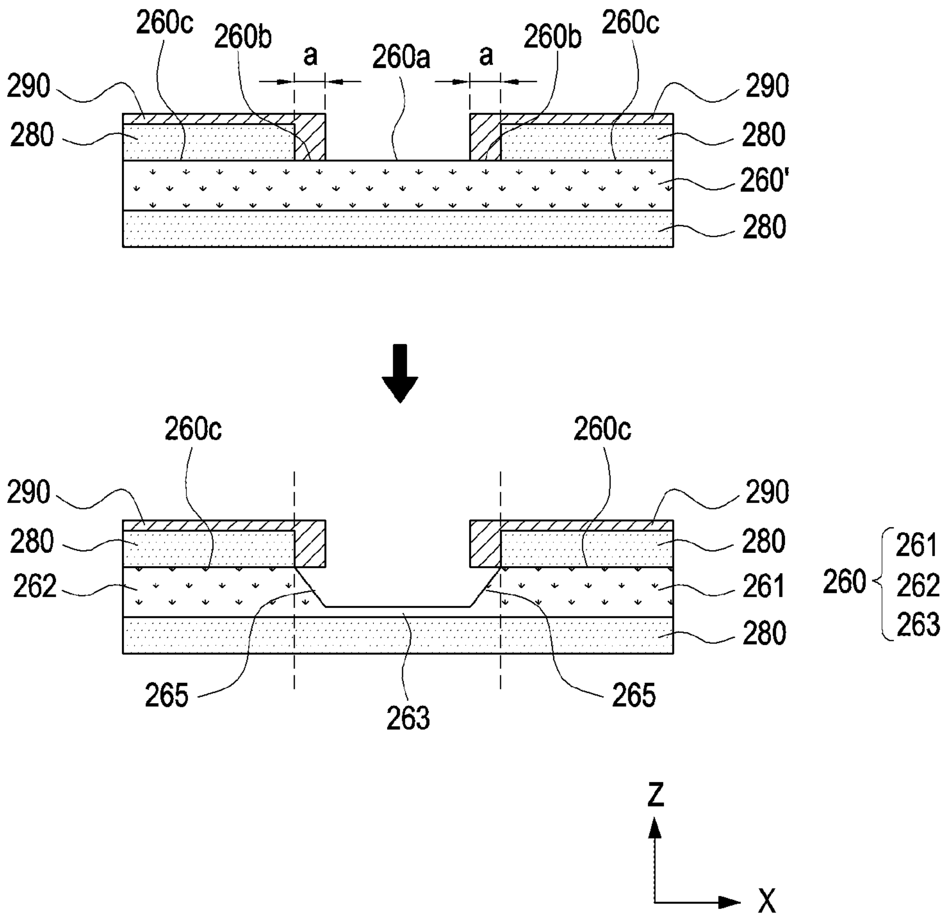
FIG. 13A is a view illustrating a window glass stacked member including a second masking layer according to an embodiment of the disclosure.
Figure 13B:
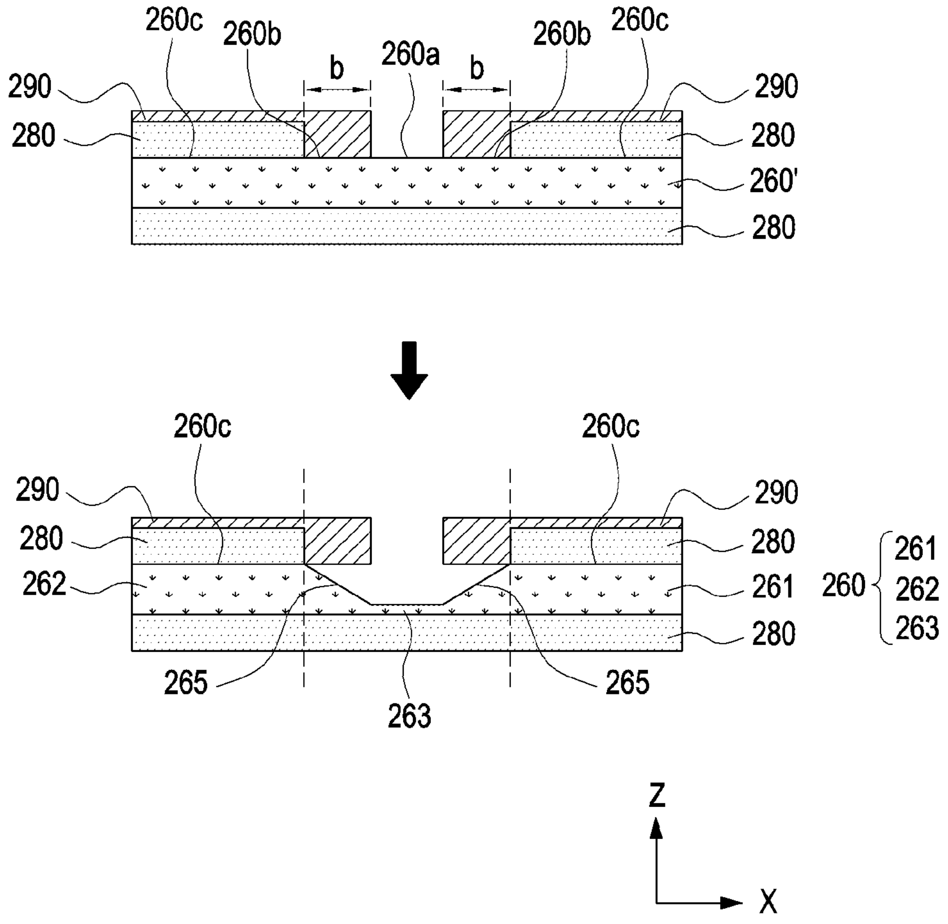
FIG. 13B is a view illustrating a window glass stacked member including a second masking layer according to an embodiment of the disclosure.

FIG. 13A is a view illustrating a window glass 260 stacked member including a second masking layer 290 according to an embodiment of the disclosure. FIG. 13B is a view illustrating a window glass 260 stacked member including a second masking layer 290 according to an embodiment of the disclosure.

FIGS. 13A and 13B illustrate another method for forming a gentle slope 265 on a surface of the window glass 260. From comparison between the embodiment of FIG. 12A and the embodiment of FIG. 13B, it is possible to form a gentler slope 265 in the window glass 260 by adjusting the width of the second masking layer 290 positioned in the area of the folding portion 263 of the window glass 260.

Referring to FIGS. 13A and 13B, it may be identified that it is possible to form a slope having a gentler slope angle when the width of the second masking layer 290 positioned in the folding portion 263 area of the window glass 260 is b which is larger than a, than when the width of the second masking layer 290 positioned in the folding portion 263 area of the window glass 260 is a. In other words, it may be more advantageous in forming a gentle slope of the window glass to increase the width of the masking layer covering the folding portion 263, from the boundaries (dashed lines) between the folding portion 263 and the flat portions 261 and 262.

Figure 14:
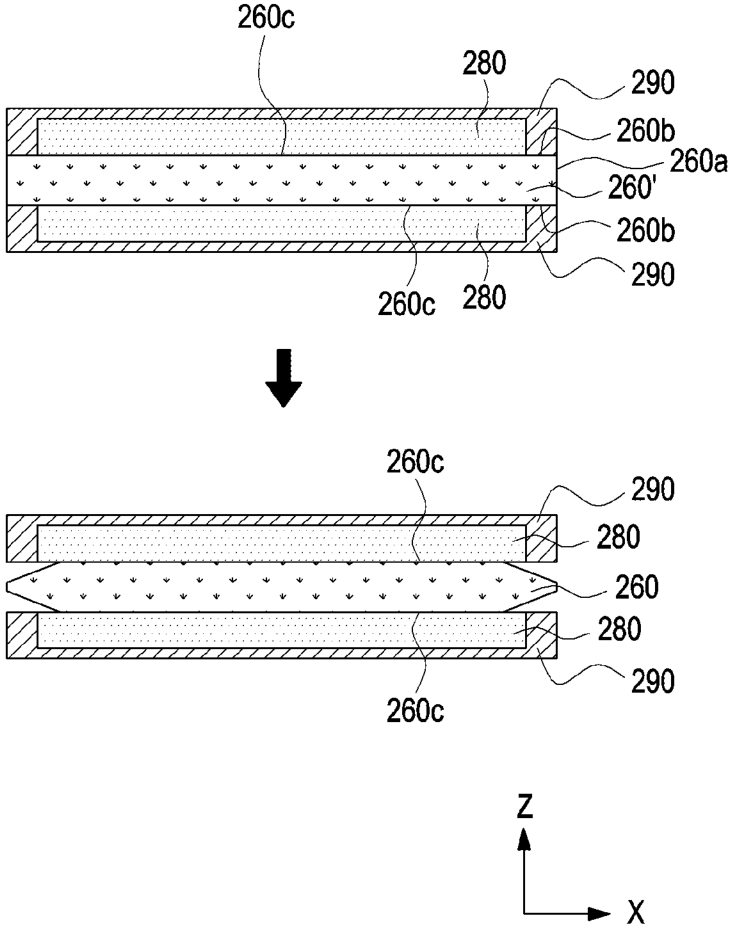
FIG. 14 is a view illustrating a window glass stacked member including a second masking layer according to an embodiment of the disclosure.

FIG. 14 is a view illustrating a window glass 260 stacked member including a second masking layer 290 according to an embodiment of the disclosure.

The above-described embodiments are embodiments in which the second masking layer 290 is formed on one surface of the window glass 260. FIG. 14 illustrates an embodiment in which the second masking layer 290 is formed on each of one surface and the other surface of the window glass 260.

Referring to FIG. 14, it is possible to manufacture a window glass 260 having a gentle slope using a plurality of masking layers 280 and 290 formed on one surface and the other surface, respectively, of the window glass 260, rather than only on one surface of the window glass 260.

Further, it is also possible to form a gentle slope in window glasses (e.g., chamfered window glasses) in other various shapes than the foldable window glass including a folding portion, using the above-described embodiments. For example, as shown in FIG. 13, a gentle slope may be formed in the edge of the window glass 260, making it possible to manufacture a chamfered window glass without mechanical processing.

Figure 15:
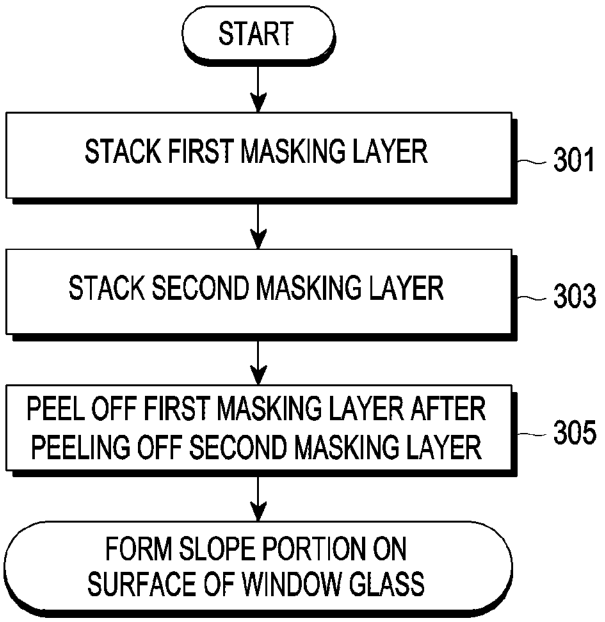
FIG. 15 is a flowchart illustrating a method for manufacturing a window glass according to an embodiment of the disclosure.

FIG. 15 is a flowchart illustrating a method for manufacturing a window glass according to an embodiment of the disclosure.

According to an embodiment, a method for manufacturing a window glass may include an operation S301 of stacking a first masking layer 280, the operation S303 of stacking a second masking layer 290, and the operation S305 of peeling off the first masking layer after peeling off the second masking layer.

The base material of the window glass 260 may be implemented of a foldable thin glass (FTG) in a foldable and very thin (e.g., about 100 μm or less) shape. The base material of the window glass 260 may be formed to correspond to the size and shape of the electronic device 101 or 200 or the flexible display 250 using a laser cutting device or a CNC processing device.

In relation to operation S301, in the method for manufacturing the window glass, the first masking layer 280 may be stacked on one or both surfaces of the base material of the window glass 260. The first masking layer 280 may be formed of a film or ink that may be finally peeled off by an etching solution and may be formed by transferring or spraying a film or ink onto the base material of the window glass 260. According to an embodiment, upon stacking the first masking layer 280, the first masking layer 280 may be stacked only in the remaining area except for the folding portion 263 of the window glass 260, thereby making boundaries between the folding portion 263 and flat portions 261 and 262 of the window glass. Alternatively, after stacking the first masking layer 280, a pattern may be formed in the area corresponding to the folding portion 263 of the window glass 260, and a portion of the first masking layer 280 stacked on the window glass may be removed, thereby making boundaries between the folding portion 263 and flat portions 261 and 262 of the window glass 260.

In relation to operation S303, in the method for manufacturing the window glass, a second masking layer 290 may additionally be stacked on the stacked member of the window glass 260 and the first masking layer 280. Here, the second masking layer 290 may at least partially overlap the surface (e.g., the first surface 260*a* of FIG. 8) of the window glass 260 and the first masking layer 280. In this case, the second masking layer 290 may overlap the first masking layer 280 (e.g., the embodiment of FIG. 8) or may not overlap the first masking layer 280 (e.g., the embodiment of FIG. 10).

In relation to operation S305, in the method for manufacturing the window glass, it is possible to form a window glass having a gentle slope by peeling off the first masking layer 280 after peeling off the second masking layer 290. A slope may be produced by dipping the window glass 260, the first masking layer 280, and the second masking layer 290 in the etching solution. Since the second masking layer 290 has lower acid resistance than the first masking layer 280, the second masking layer 290 may be peeled off first, and the first masking layer 280 may then be peeled off. When the second masking layer 290 is peeled off, a solution capable of etching window glass is used so that the window glass may be peeled off together. When peeling off the first masking layer 280 after the second masking layer 290 is peeled off, a solution that does not etch window glass may be used so that only the first masking layer 290 may be peeled off. It is possible to form a window glass having a gentle slope 265 whose slope angle is lower than when etching a single masking layer, using such a peel-off speed of the first masking layer 280 and the second masking layer 290.

According to an embodiment, it is possible to form a window glass having a gentler slope by stacking the second masking layer 290 and then additionally stacking a masking layer (e.g., the third masking layer) having lower acid resistance than the second masking layer 290, followed by peeling off it from the additionally stacked masking layer (e.g., the third masking layer).

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 40) including one or more instructions that are stored in a storage medium (e.g., internal memory 36 or external memory 38) that is readable by a machine (e.g., the electronic device 01). For example, a processor (e.g., the processor 20) of the machine (e.g., the electronic device 01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an electronic device may include a display 250; a window glass stacked with the display and including a first portion having a specified thickness and a second portion having a thickness less than a thickness of the first portion; and an adhesive member 270 comprising an adhesive material disposed between the display and the window glass; wherein the window glass includes a slope 265 having an angle of 3 degrees or less between the first portion and the second portion.

According to an embodiment, the window glass may include a foldable window glass. the first portion comprises two flat portions having a specified thickness and are substantially flat, and the second portion comprises a folding portion configured to be fordable and positioned between the two flat portions.

According to an embodiment, the slope may prevent the first portion and the second portion from having a stepped shape.

According to an embodiment, the window glass may include a window glass dipped in an etching solution to etch a surface of the second portion.

According to an embodiment, a plurality of masking layers are stacked on a surface of the window glass before dipping the window glass in the etching solution.

According to an embodiment, the plurality of masking layers may include a first masking layer and a second masking layer having lower acid resistance than an acid resistance of the first masking layer.

According to an embodiment, the second masking layer may comprise a composition including a monomer ratio greater than a monomer ratio of the first masking layer.

According to an embodiment, the first masking layer and the second masking layer may comprise an ink configured to be peeled off by the etching solution.

According to an embodiment, the first masking layer may comprise a film configured to be peeled off by the etching solution, and the second masking layer may comprise ink configured to be peeled off by the etching solution.

According to an embodiment, the electronic device may comprises a third masking layer having lower acid resistance than an acid resistance of the first masking layer and the second masking layer.

According to an embodiment, the third masking layer may be stacked on a surface of the window glass to have a thickness less than a thickness of the second masking layer.

According to an embodiment, the second masking layer may comprise an ink material having an acidity greater than pH 6.0.

According to an embodiment of the disclosure of a method of manufacturing a window glass, the method may include stacking a first masking layer on at least one surface of a window glass base material; stacking a second masking layer at least partially contacting the first masking layer and a surface of the window glass base material and having lower acid resistance than an acid resistance of the first masking layer; peeling off the second masking layer; and peeling off the first masking layer after peeling off the second masking layer.

According to an embodiment, the second masking layer may comprise an ink material having a acidity greater than pH 6.0.

According to an embodiment, at least a portion of the second masking layer may be stacked on a folding portion of the window glass.

According to an embodiment, the method may comprise stacking a third masking layer **290*b*** at least partially contacting the window glass base material and the second masking layer and having lower acid resistance than the acid resistance of the first masking layer and the second masking layer before dipping the window glass in an etching solution.

According to an embodiment, the third masking layer may be peeled off before peeling off the second masking layer.

According to an embodiment, the third masking layer may be stacked on a surface of the window glass to have a thickness less than a thickness of the second masking layer.

According to an embodiment, the second masking layer may comprise a composition including a monomer ratio greater than a monomer ratio of the first masking layer.

According to an embodiment, the first masking layer may be formed by transferring a film or applying an ink configured to be peeled off by the etching solution, and the second masking layer may be formed by applying an ink configured to be peeled off by the etching solution.

While the disclosure has been illustrated and described with reference to various example embodiments thereof, it will be understood that the various example embodiments are intended to be illustrative, not limiting. It will be further apparent to those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. A window-glass preform for forming a window glass for an electronic device including a display, the window-glass preform comprising, a window glass including a first portion having a specified thickness and a second portion having a thickness less than the specified thickness of the first portion, wherein the window glass includes a slope having an angle of 3 degrees or less between the first portion and the second portion; and a plurality of masking layers stacked on at least one surface of the window glass prior to dipping the window glass in an etching solution, the plurality of masking layers comprising:

a first masking layer having a first acid resistance, and a second masking layer disposed on the first masking layer and having a second acid resistance lower than the first acid resistance, the second masking layer comprising an ink material having an acidity greater than pH 6.0, wherein the plurality of masking layers are configured to be progressively peeled off during etching according to their respective acid resistances to define the slope of 3 degrees or less between the first portion and the second portion of the window glass.

2. The window-glass preform of claim 1, wherein the window glass includes a foldable window glass wherein:

the first portion comprises two flat portions having a specified thickness and are substantially flat, and the second portion comprises a folding portion configured to be foldable and positioned between the two flat portions.

3. The window-glass preform of claim 1, wherein the slope prevents the first portion and the second portion from having a stepped shape.

4. The window-glass preform of claim 1, wherein the second masking layer comprises a composition including a monomer ratio greater than a monomer ratio of the first masking layer.

5. The window-glass preform of claim 1, wherein the first masking layer and the second masking layer comprise an ink configured to be peeled off by the etching solution.

6. The window-glass preform of claim 1, wherein the first masking layer comprises a film configured to be peeled off by the etching solution, and the second masking layer comprises ink configured to be peeled off by the etching solution.

7. The window-glass preform of claim 1, further comprising a third masking layer having lower acid resistance than an acid resistance of the first masking layer and the second masking layer.

8. The window-glass preform of claim 7, wherein the third masking layer is stacked on a surface of the window glass to have a thickness less than a thickness of the second masking layer.

* * * * *